US009799132B2

(12) United States Patent
Okano et al.

(10) Patent No.: US 9,799,132 B2
(45) Date of Patent: Oct. 24, 2017

(54) DRIVING SUPPORT APPARATUS FOR TOW COUPLING

(71) Applicant: Panasonic Intellectual Property Management Co., Ltd., Osaka (JP)

(72) Inventors: Kenji Okano, Aichi (JP); Yashio Kishi, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/336,979

(22) Filed: Oct. 28, 2016

(65) Prior Publication Data

US 2017/0053428 A1    Feb. 23, 2017

Related U.S. Application Data

(63) Continuation of application No. 13/985,014, filed as application No. PCT/JP2012/001158 on Feb. 21, 2012, now Pat. No. 9,516,275.

(30) Foreign Application Priority Data

Mar. 2, 2011   (JP) ................................. 2011-044650

(51) Int. Cl.
*H04N 7/00* (2011.01)
*G06T 11/60* (2006.01)
*B60R 1/00* (2006.01)
*B62D 15/02* (2006.01)
*H04N 7/18* (2006.01)
(Continued)

(52) U.S. Cl.
CPC ................ *G06T 11/60* (2013.01); *B60D 1/36* (2013.01); *B60D 1/62* (2013.01); *B60R 1/00* (2013.01);
(Continued)

(58) Field of Classification Search
CPC ............. H04N 7/18; B60D 1/36; B60R 1/003
(Continued)

(56) References Cited

U.S. PATENT DOCUMENTS 8,138,899 B2      3/2012   Ghneim
2002/0145662 A1*  10/2002  Mizusawa ................ B60D 1/36
                                                          348/118
(Continued)

FOREIGN PATENT DOCUMENTS

CN    1460375 A    12/2003
CN    1604645 A    4/2005
(Continued)

OTHER PUBLICATIONS

European Search Report issued in Patent Application No. 12 75 2034 dated Aug. 11, 2014.
(Continued)

*Primary Examiner* — Jeffery Williams
(74) *Attorney, Agent, or Firm* — Pearne & Gordon LLP

(57) ABSTRACT

A driving support device outputs, to a display means (103), a superimposed image in which a pair of left and right planar predicted trajectory guide marks (405), (406) corresponding to steering of the vehicle are superimposed onto a captured vehicle-rearview image including the tow vehicle connector (402) and the towed-vehicle connector (404). An image superimposing unit (112) superimposes sides (405a), (406a) of the predicted trajectory guide marks (405), (406) that are on the vehicle-width-center side further towards the outer edge relative to the tow vehicle connector (402), and superimposes sides (405b), (406b) of the predicted trajectory guide marks (405), (406) that are on the outer-edge side in the vehicle-width direction as predicted trajectories of the side edges of the vehicle.

8 Claims, 7 Drawing Sheets

(51) Int. Cl.
  *B60D 1/36* (2006.01)
  *G06T 11/00* (2006.01)
  *B60D 1/62* (2006.01)
  *G06K 9/00* (2006.01)
  *H04N 5/232* (2006.01)

(52) U.S. Cl.
  CPC .......... *B60R 1/003* (2013.01); *B62D 15/0275* (2013.01); *B62D 15/0295* (2013.01); *G06K 9/00805* (2013.01); *G06T 11/00* (2013.01); *H04N 5/23293* (2013.01); *H04N 7/18* (2013.01); *H04N 7/183* (2013.01); *B60R 2300/30* (2013.01); *B60R 2300/305* (2013.01); *B60R 2300/806* (2013.01); *B60R 2300/808* (2013.01); *Y02T 10/84* (2013.01)

(58) Field of Classification Search
  USPC ........................................................ 348/148
  See application file for complete search history.

(56) References Cited

U.S. PATENT DOCUMENTS

| | | | |
|---|---|---|---|
| 2002/0145663 A1 | 10/2002 | Mizusawa | |
| 2002/0149673 A1 | 10/2002 | Hirama | |
| 2005/0074143 A1* | 4/2005 | Kawai | B60D 1/36 382/104 |
| 2010/0265048 A1* | 10/2010 | Lu | B60Q 9/005 340/435 |
| 2011/0001614 A1 | 1/2011 | Ghneim | |
| 2011/0181441 A1* | 7/2011 | Ma | B60R 1/00 340/932.2 |
| 2012/0158256 A1 | 6/2012 | Kuboyama | |

FOREIGN PATENT DOCUMENTS

| | | |
|---|---|---|
| EP | 1 249 365 A1 | 10/2002 |
| JP | 2002-312768 A | 10/2002 |
| JP | 2002-359839 A | 12/2002 |
| JP | 2005-112004 A | 4/2005 |
| JP | 2007-076496 A | 3/2007 |
| JP | 2009-173386 A | 8/2009 |
| WO | 2011-010346 A1 | 1/2011 |

OTHER PUBLICATIONS

International Search Report issued in Application No. PCT/JP2012/0001158 dated May 29, 2012.

* cited by examiner

DRIVING SUPPORT APPARATUS FOR TOW COUPLING

This is a continuation of U.S. patent application Ser. No. 13/985,014 filed on Aug. 12, 2013 which is the National Phase Entry of International Application No. PCT/JP2012/001158 filed on Feb. 21, 2012 which claims priority from Japanese Patent Application No. 2011-044650 filed on Mar. 2, 2011. The contents of these applications are incorporated herein by reference in their entireties.

TECHNICAL FIELD

The present invention relates to a driving support apparatus configured to perform appropriate visibility support for coupling a tow vehicle to a tow-target vehicle.

BACKGROUND ART

In general, there is known a vehicle guiding method to prevent a lateral surface of a vehicle body from coming into contact with an obstacle in the backward direction of the vehicle when the vehicle moves backward. This method guides a vehicle by superimposing, on the monitor, a pair of left and right predicted-trajectories corresponding to the vehicle width in accordance with a steering turning angle (see Patent Literature (hereinafter, referred to as "PTL") 1, for example). Moreover, another known vehicle guiding method is to guide a vehicle through the current state of the vehicle by superimposing, on the monitor, fixed trajectories corresponding to a zero steering turning angle (see PTL 2, for example).

Furthermore, there is known a vehicle guiding method used when the driving support target is a tow vehicle in order for the tow vehicle to be coupled to a tow-target vehicle. In general, when a tow vehicle is coupled to a tow-target vehicle, the tow vehicle is moved backward so as to move a tow vehicle side coupler (e.g., hitch ball) installed at a rear portion of the tow vehicle to the vicinity of a tow-target vehicle side coupler (e.g., towing hitch). For moving the tow vehicle side coupler backward, there is known a method that accurately guides a vehicle to perform positioning between the tow vehicle side coupler and the tow-target vehicle side coupler, by superimposing, on the monitor screen, guiding lines for positioning between the tow vehicle side coupler and the tow-target vehicle side coupler (see PTL 3, for example).

CITATION LIST

Patent Literatures

PTL 1
Japanese Patent Application Laid-Open No. 2009-173386
PTL 2
Japanese Patent Application Laid-Open No. 2007-76496
PTL 3
Japanese Patent Application Laid-Open No. 2002-312768

SUMMARY OF INVENTION

Technical Problem

For coupling a tow vehicle to a tow-target vehicle, it is desirable to provide both of a projected trajectory guide for avoiding an obstacle in the backward direction of the tow vehicle side coupler from coming into contact with a lateral surface of the vehicle body, and a positioning guide between the tow vehicle side coupler and the tow-target vehicle side coupler.

However, the driving support apparatus according to the related art superimposes two types of guiding lines, which are predicted-trajectory guiding lines and positioning guiding lines, independently on the monitor. Accordingly, many guiding lines appear on the monitor, which in turn makes it difficult for drivers to intuitively recognize the meaning of each guiding line. Even worse, superimposing fixed trajectory guiding lines on the monitor makes it even more difficult for the drivers to intuitively recognize the meaning of each guiding line.

In addition, in the positioning guide between the tow vehicle side coupler and the tow-target vehicle side coupler of the related art, one end of a guiding line is superimposed on a portion of the monitor which corresponds to the tow vehicle side coupler. The driver thus drives the tow vehicle in such a way that the other end of the guiding line covers a portion of the monitor which corresponds to the tow-target vehicle side coupler. In a guiding method of this kind, the guiding line makes it harder for the tow vehicle side coupler and the tow-target vehicle side coupler to be visually recognized on the monitor, which in turn leads to a problem that makes it even harder for the drivers to recognize the positional relation between the tow vehicle side coupler and the tow-target vehicle side coupler.

It is an object of the present invention to provide a driving support apparatus and a tow vehicle each of which makes it possible to intuitively recognize a guide for avoiding an obstacle in the backward direction from coming into contact with a lateral surface of a vehicle body and a guide for positioning between a tow vehicle side coupler and a tow-target vehicle side coupler, and also to keep the tow vehicle side coupler and the tow-target vehicle side coupler visible.

Solution to Problem

In order to achieve the abovementioned object, according to the present invention, a superimposing section superimposes sides of predicted-trajectory guide marks respectively at positions in an outer edge direction from a tow coupler, which sides are located on a center side of a vehicle width direction, and the superimposing section superimposes sides of the predicted-trajectory guide marks respectively as predicted-trajectories of both lateral edges of a tow vehicle, which sides are located on an outer edge side of the vehicle width direction.

Advantageous Effect of Invention

According to the present invention, it is made possible to intuitively recognize a guide for avoiding an obstacle in the backward direction from coming into contact with a lateral surface of a vehicle body and a guide for positioning between a tow vehicle side coupler and a tow-target vehicle side coupler, and also to keep the tow vehicle side coupler and the tow-target vehicle side coupler visible.

DESCRIPTION OF EMBODIMENT

Hereinafter, a driving support apparatus of an embodiment of the present invention will be described with reference to the drawings.

Figure 1:
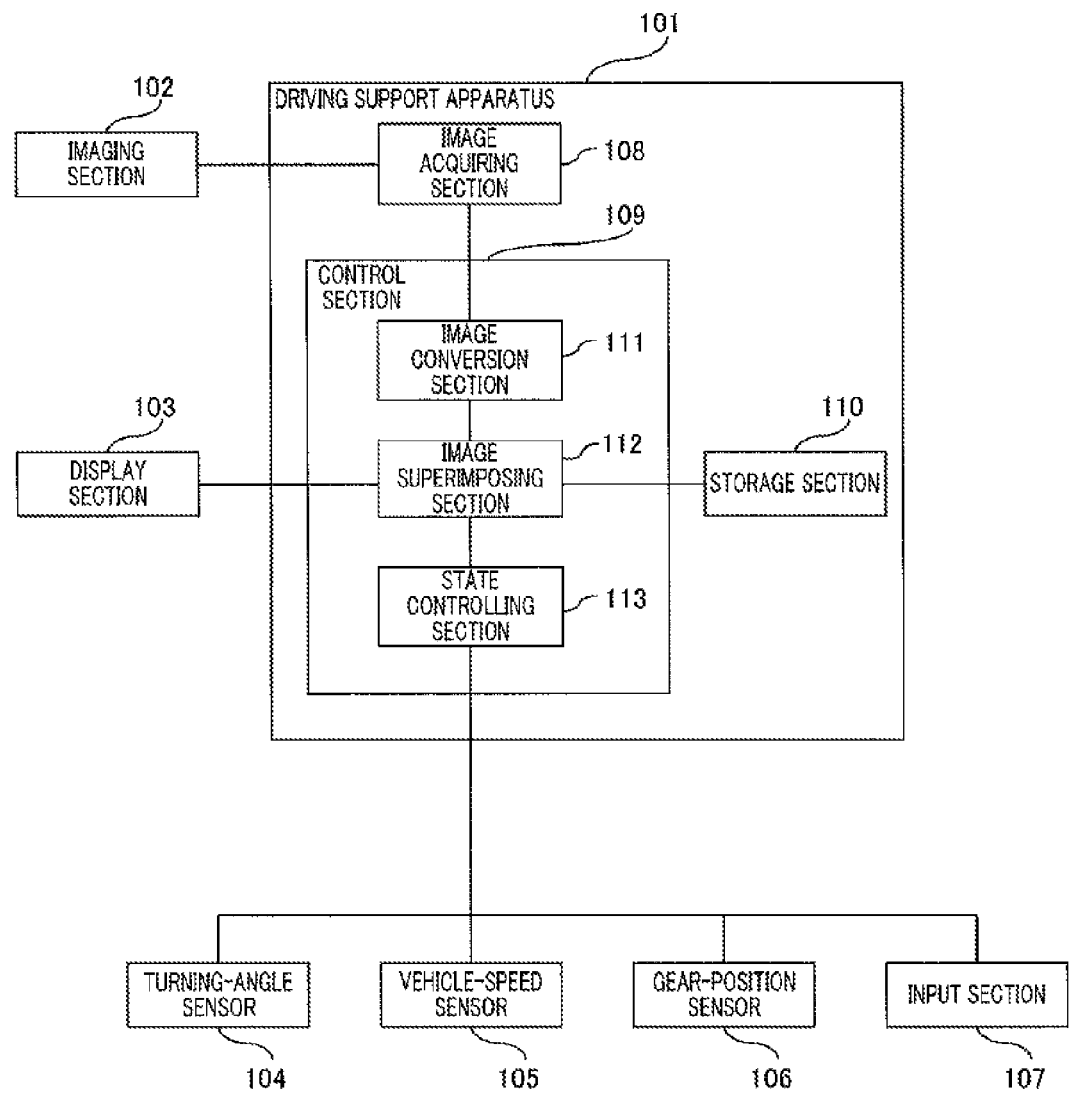
FIG. 1 is a block diagram illustrating a configuration of a driving support apparatus in an embodiment of the present invention.

FIG. 1 is a block diagram illustrating a configuration of driving support apparatus 101 of the embodiment of the present invention.

In FIG. 1, driving support apparatus 101 is connected to imaging section 102, display section 103, turning-angle sensor 104, vehicle-speed sensor 105, gear-position sensor 106, and input section 107. Note that, imaging section 102, display section 103, turning-angle sensor 104, vehicle-speed sensor 105, gear-position sensor 106, and input section 107 may be included in driving support apparatus 101 or be included in a tow vehicle together with driving support apparatus 101.

Driving support apparatus 101 includes image acquiring section 108, control section 109, and storage section 110.

Driving support apparatus 101 generates a superimposed image by superimposing a pair of left and right predicted-trajectory guide marks in accordance with steering operation of the tow vehicle on a captured image of an area behind the tow vehicle received from imaging section 102, on the basis of the input signals from turning-angle sensor 104, vehicle-speed sensor 105, gear-position sensor 106, and input section 107. Driving support apparatus 101 outputs the generated superimposed image to display section 103.

Imaging section 102 includes a camera. Imaging section 102 is attached to a rear portion of the tow vehicle. For example, imaging section 102 is attached near the license plate or trunk of the tow vehicle.

Imaging section 102 may include a plurality of cameras. In addition, imaging section 102 may be attached to any position as long as the position allows imaging section 102 to capture an image of the area behind the tow vehicle including a tow coupler at the rear portion of the tow vehicle and a tow-target vehicle side coupler of a tow-target vehicle (hereinafter, referred to as "tow-target coupler") which is to be coupled to the tow coupler.

Display section 103 includes a navigation apparatus, for example. Display section 103 is provided in the vehicle in such a way as to be viewable from the driving seat. Display section 103 receives, from driving support apparatus 101, a superimposed image generated by superimposing a pair of left and right predicted guide marks on a captured image of the area behind the tow vehicle and displays this superimposed image.

Turning-angle sensor 104 outputs a turning angle signal indicating the turning angle of the steering to driving support apparatus 101.

Vehicle-speed sensor 105 outputs a vehicle speed signal indicating the vehicle speed of the tow vehicle to driving support apparatus 101.

Gear-position sensor 106 outputs a gear position state signal indicating the state of the gear position to driving support apparatus 101.

Input section 107 outputs an input signal indicating an instruction command from a user to driving support apparatus 101. Input section 107 includes a touch panel, a remote controller, switches or operation buttons, for example. When input section 107 is a touch panel, input section 107 may be provided to display section 103. Input section 107 is operated by the user and outputs an input signal indicating an instruction command from the user to driving support apparatus 101. For example, input section 107 outputs, to driving support apparatus 101, a command signal to switch between predicted-trajectory guide marks for assisting coupling between a tow vehicle and a tow-target vehicle. In the following description, the term "predicted-trajectory guide mark for assisting coupling between a tow vehicle and a tow-target vehicle" is simply referred to as a "predicted-trajectory guide mark."

Next, the internal configuration of driving support apparatus 101 will be described.

Driving support apparatus 101 includes image acquiring section 108, control section 109 to be connected to image acquiring section 108, and storage section 110 to be connected to control section 109. Control section 109 includes image conversion section 111, image superimposing section 112, and state controlling section 113.

Image acquiring section 108 is formed of a nonvolatile memory such as a buffer memory. Image acquiring section 108 is connected to imaging section 102. Image acquiring section 108 temporarily stores video data obtainable from captured video received from imaging section 102. The video data stored in image acquiring section 108 is outputted to image conversion section 111 of control section 109.

Control section 109 includes a very large scale integration (VLSI) chip or a central processing unit (CPU), for example. Control section 109 is connected to display section 103, turning-angle sensor 104, a vehicle-speed sensor 105, gear-position sensor 106, input section 107, image acquiring section 108, and storage section 110. Control section 109 performs video processing for guiding a vehicle to move backward (hereinafter, referred to as "backward guiding") based on a turning angle signal from turning-angle sensor 104 and a reverse signal from gear-position sensor 106. In addition, control section 109 performs video processing for providing backward guiding for towing based on an input signal that prompts backward guiding for towing from input section 107. Note that, control section 109 may further perform various processing operations using an input signal from vehicle-speed sensor 105. Hereinafter, a description will be further provided with image conversion section 111, image superimposing section 112 and state controlling section 113 in control section 109. However, the connection, and input and output of data, and processing of these component elements to outside of control section 109 are defined to be the same as the connection, and input and output of data, and processing of control section 109 to outside of control section 109.

Storage section 110 includes a nonvolatile memory such as a flash memory or a read only memory (ROM). Storage section 110 stores therein predicted-trajectory guide marks, predicted-trajectories for backward guiding in accordance with a turning angle, fixed trajectories for backward guiding corresponding to a zero turning angle, image data specific to the tow vehicle, such as a distance indicator, and various programs for controlling by control section 109. Predicted guide marks are formed of a pair of left and right planar shapes.

Image conversion section 111 and image superimposing section 112 are formed of an image processor such as an application specific integrated circuit (ASIC). Image conversion section 111 performs image processing on the captured video received from image acquiring section 108, converts the processed video into video signals displayable on display section 103 and outputs the video signals to image superimposing section 112.

Imaging superimposing section 112 selectively reads predicted-trajectories or fixed trajectories, or image data such as a distance indicator from storage section 110 and superimposes the selected trajectories or data in accordance with an instruction from state controlling section 113. Image superimposing section 112 outputs the superimposed video generated every predetermined time to display section 103.

State controlling section 113 instructs image superimposing section 112 to superimpose predicted-trajectory guide marks, predicted-trajectories, or fixed trajectories, or image data such as a distance indicator for towing, or to output a combined video to display section 103, for example. State controlling section 113 instructs image superimposing section 112 to perform image superimposition for backward guiding, using a turning angle signal from turning-angle sensor 104 and a reverse signal from gear-position sensor 106, for example. In addition, upon acquisition of an input signal prompting backward guiding for towing from input section 107, state controlling section 113 instructs image superimposing section 112 to perform image superimposition for backward guiding for towing.

Next, a description will be provided regarding driving support processing performed by driving support apparatus 101.

Figure 2:
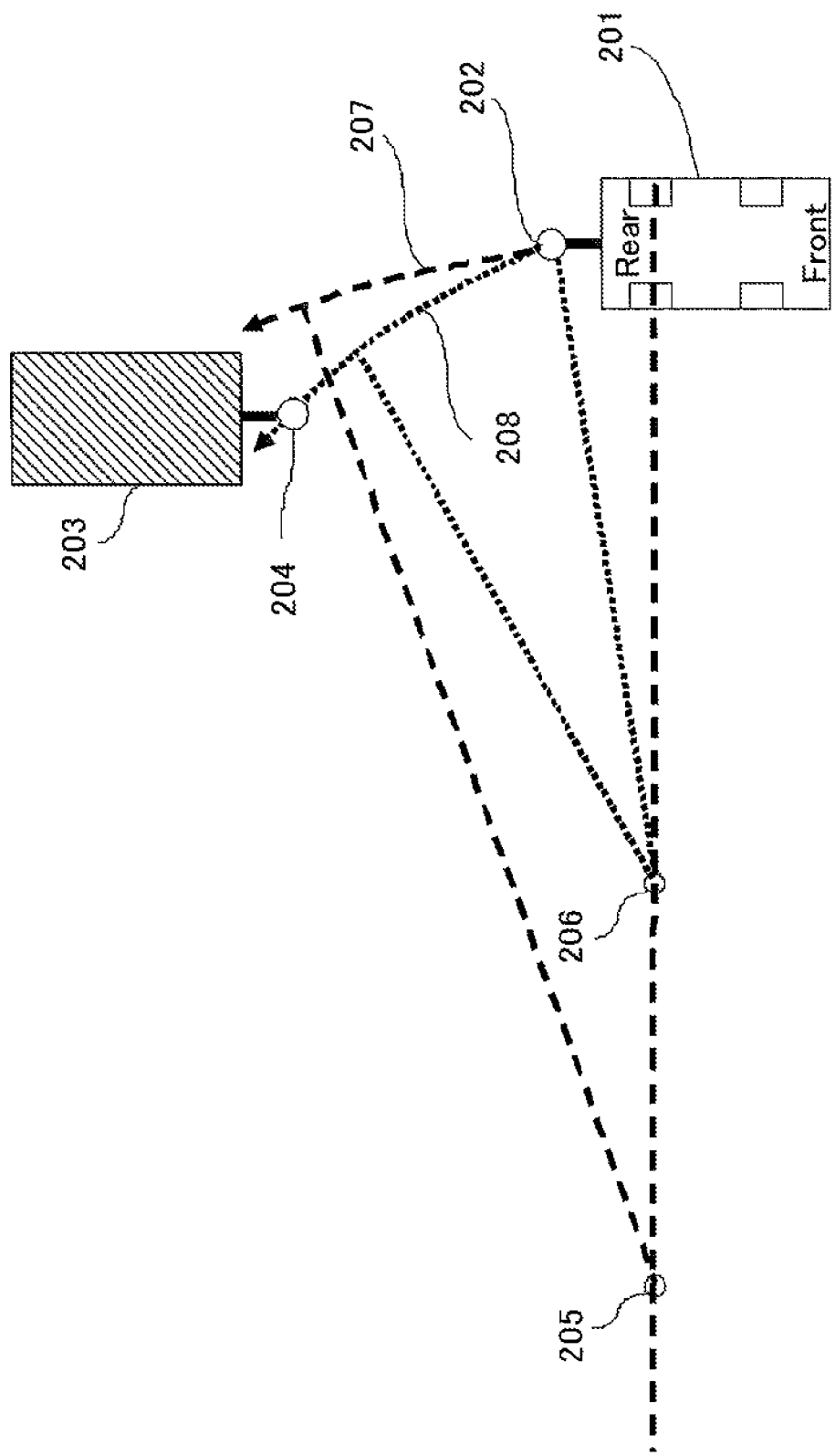
FIG. 2 is a diagram illustrating a representation of operation of a tow vehicle in which the driving support apparatus corresponding to a primary portion of FIG. 1 is installed.

FIG. 2 is a diagram illustrating a representation of operation of tow vehicle 201 in which driving support apparatus 101 is installed.

As illustrated in FIG. 2, tow vehicle 201 moves backward for coupling tow coupler 202 provided at the rear portion of the tow vehicle to tow-target coupler 204 of tow-target vehicle 203. Rotation centers 205 and 206 are used for indicating an appropriate rotation center when the steering turning angle of tow vehicle 201 is smaller than an appropriate amount. Rotation centers 205 and 206 are each indicated by a point on the rear axis of tow vehicle 201 in accordance with the steering turning angle on the basis of the Ackerman model. Rotation centers 205 and 206 makes it possible to predict a moving path of tow coupler 202. For example, when the steering turning angle is small, tow coupler 202 moves along moving path 207, and when the steering turning angle is appropriate, tow coupler 202 moves along moving path 208. Predicted-trajectory guide marks are drawn on display section 103 on the basis of these moving paths in accordance with the steering. Drivers can adjust the steering turning angle in such a way that tow coupler 202 moves toward tow-target coupler 204 by observing the predicted-trajectory guide marks.

Next, a description will be provided regarding a guide for assisting coupling between tow vehicle 201 and a tow-target vehicle by driving support apparatus 101 of the present invention (hereinafter, simply referred to as "towing guide")

Figure 3:
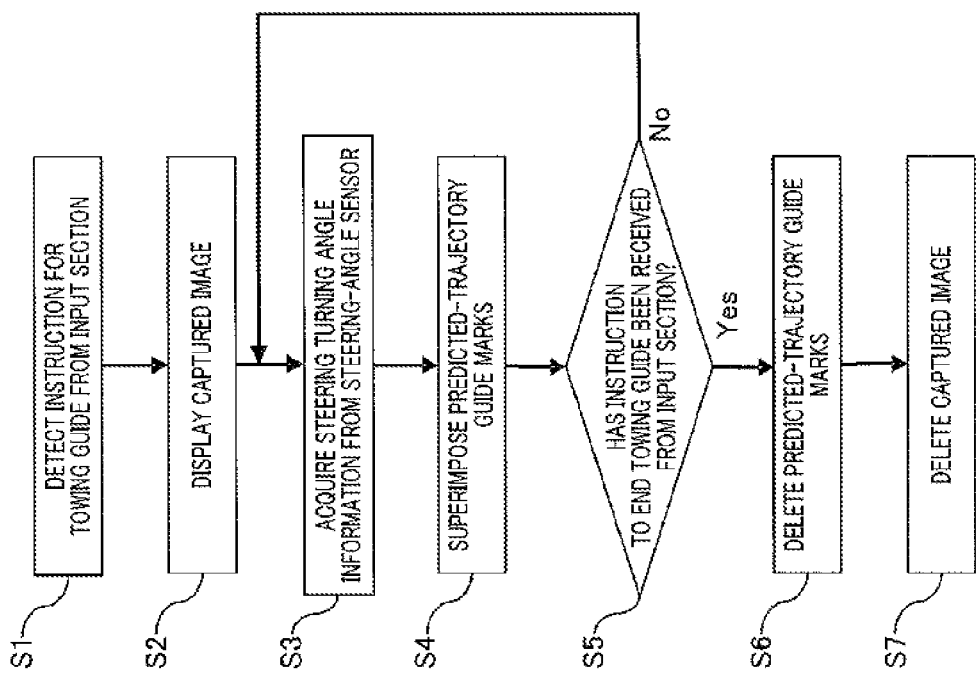
FIG. 3 is a flowchart illustrating how a guide for assisting coupling between a tow vehicle and a tow-target vehicle is provided by the driving support apparatus corresponding to the primary portion of FIG. 1.

FIG. 3 is flowchart for describing a towing guide provided by driving support apparatus 101 of the present invention.

First, as illustrated in step S1, state controlling section 113 detects an instruction to start a towing guide, which has been received from input section 107, and starts processing.

Next, as illustrated in step S2, display section 103 displays a rear image captured by imaging section 102. Specifically, image conversion section 111 converts the captured image acquired from image acquiring section 108 into displayable video signals. The converted video signals are outputted to display section 103 via image superimposing section 112.

Next, as illustrated in step S3, state controlling section 113 acquires steering turning angle information from steering-angle sensor 104.

Next, as illustrated in step S4, image superimposing section 112 reads predicted-trajectory guide marks from storage section 110 on the basis of the turning angle information from steering angle sensor 104, which has been acquired by state controlling section 113. Image superimposing section 112 superimposes the predicted-trajectory guide marks read from storage section 110 on the video signals obtained by conversion in step S2. Display section 103 displays the superimposed image outputted from image superimposing section 112.

Next, as illustrated in step S5, state controlling section 113 determines whether or not an instruction to end the towing guide has been received from input section 107.

Next, in case of NO in step S5, control section 109 performs the processing in step S3 again and continues the towing guide.

In case of YES in step S5, as illustrated in step S6, image superimposing section 112 deletes the predicted-trajectory guide marks superimposed in step S4. In addition, as illustrated in step S7, outputting of the video signals obtained by conversion by image converting section 111 to display section 103 is stopped. As a result, display section 103 cancels displaying of a captured image of the area behind the tow vehicle.

Next, a description will be provided regarding predicted-trajectory guide marks to be superimposed by image superimposing section 112.

Figure 4:
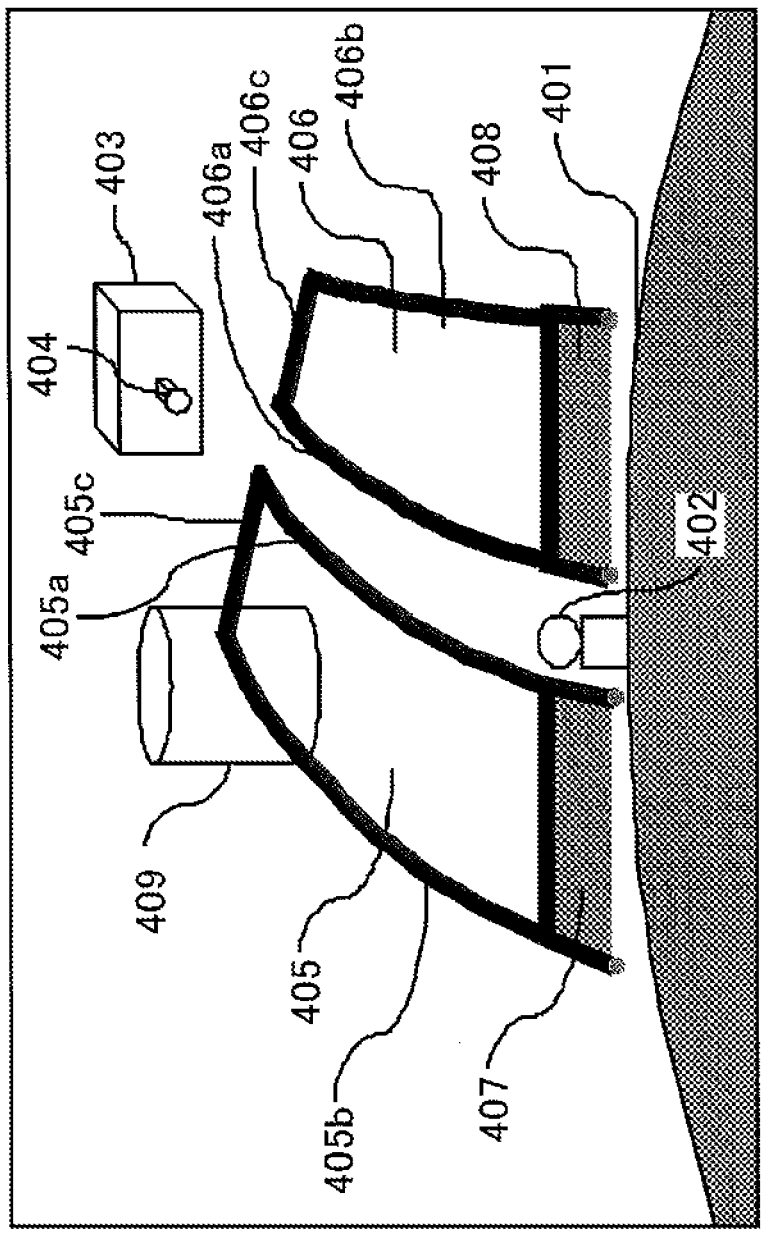
FIG. 4 is a diagram illustrating a representation of predicted-trajectory guide marks to be superimposed by an image superimposing section in the primary portion of FIG. 1.
Figure 5:
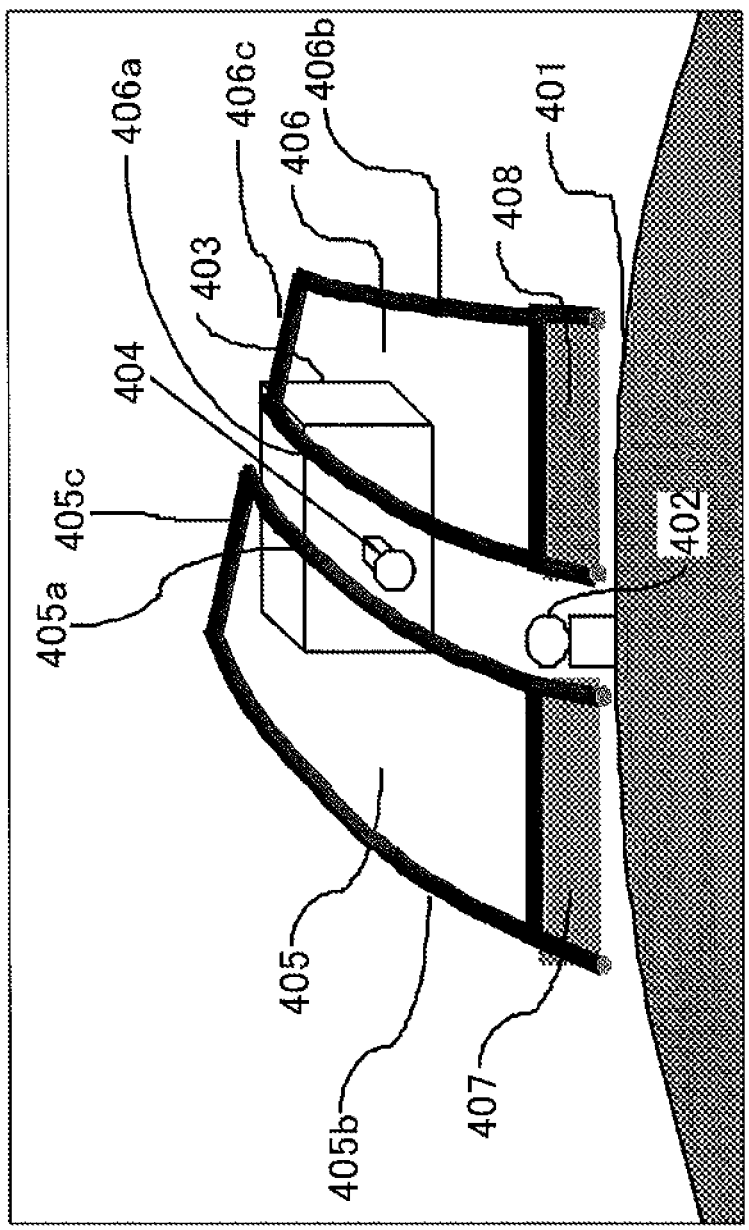
FIG. 5 is a diagram illustrating a representation of predicted-trajectory guide marks to be superimposed by the image superimposing section when the tow vehicle moves backward from the position illustrated in FIG. 4.
Figure 6:
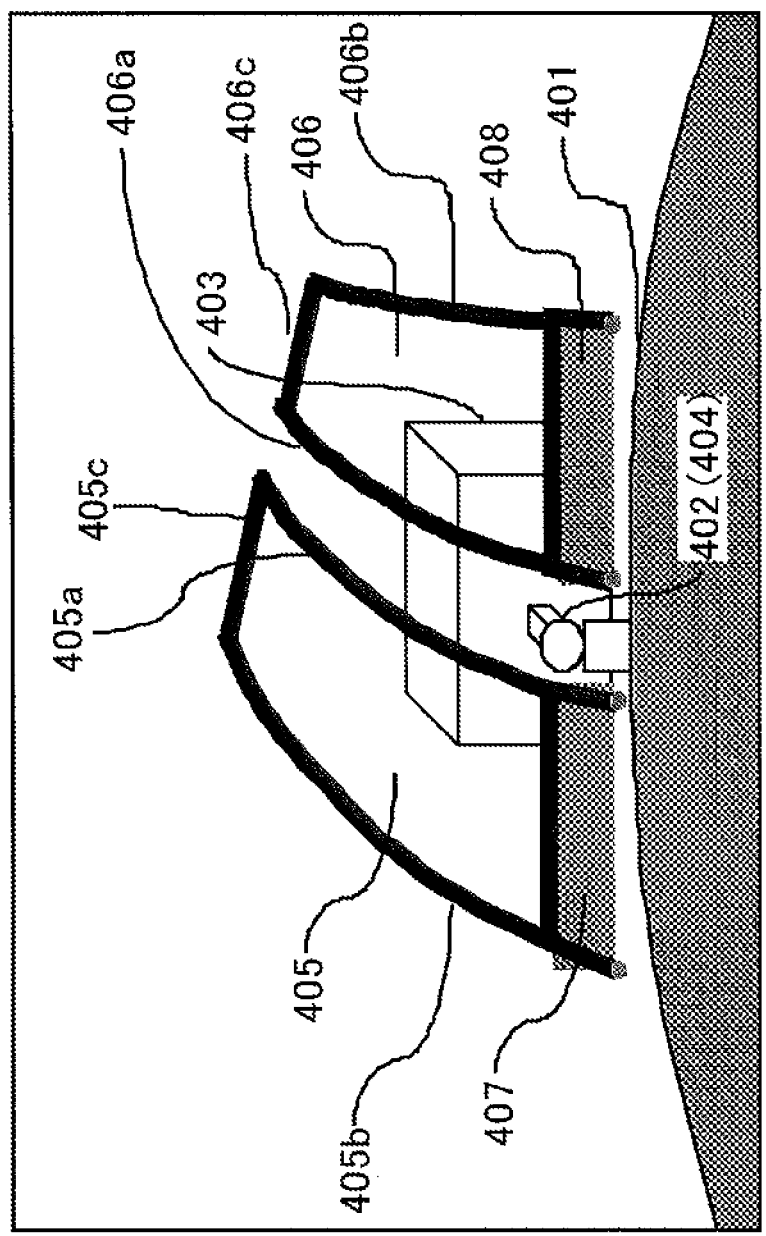
FIG. 6 is a diagram illustrating a representation of predicted-trajectory guide marks to be superimposed by the image superimposing section when the tow vehicle moves backward from the position illustrated in FIG. 5.

FIG. 4 is a diagram illustrating a representation of predicted-trajectory guide marks to be superimposed by image superimposing section 112. FIG. 5 is a diagram illustrating a representation of predicted-trajectory guide marks to be superimposed by image superimposing section 112 when the tow vehicle moves backward from the state illustrated in FIG. 4. FIG. 6 is a diagram illustrating a representation of predicted-trajectory guide marks to be superimposed by image superimposing section 112 when the tow vehicle further moves backward from the state illustrated in FIG. 5. It should be noted that, a description will be provided hereinafter using FIGS. 4 to 6 as the display images to be displayed on display section 103, but the images on FIGS. 4 to 6 mean both of a superimposed image formed by superimposition performed by image superimposing section 112 and a display image to be displayed on display section 103.

As illustrated in FIG. 4, the display image shows tow vehicle 401, tow vehicle side coupler 402, tow-target vehicle 403, tow-target vehicle side coupler 404, and obstacle 409. In addition, predicted-trajectory guide marks 405, 406 formed of a pair of left and right planar shapes in accordance with steering operation of the tow vehicle are superimposed.

Predicted-trajectory guide marks 405, 406 are formed of sides 405*a*, 406*a* on the center side of the vehicle width direction, sides 405*b*, 406*b* on the outer edge side of the vehicle width direction, and sides 405*c*, 406*c* in the backward direction, respectively.

Sides 405*a*, 406*a* of predicted-trajectory guide marks 405, 406 which are located on the center side of the vehicle width direction are superimposed at positions in an outer edge direction from tow vehicle side coupler 402. To put it differently, side 405*a* of left predicted-trajectory guide mark 405 on the center side of the vehicle width direction is superimposed in the leftward direction from tow vehicle coupler 402. Side 406*a* of right predicted-trajectory guide mark 406 on the center side of the vehicle width direction is superimposed in the rightward direction from tow vehicle side coupler 402. For this reason, tow vehicle side coupler 402 is displayed in a gap between side 405*a* of the vehicle width direction of left predicted-trajectory guide mark 405 on the center side and side 406*a* of right predicted-trajectory guide mark 406 on the center side of the vehicle width direction. Thus, predicted-trajectory guide marks 405 and 406 are separated from tow vehicle side coupler 402 without overlapping tow vehicle side coupler 402. The region between side 405*a* and side 406*a* indicates a predicted-trajectory of tow vehicle side coupler 402.

Sides 405*b*, 406*b* of predicted-trajectory guide marks 405 and 406 which are located on the outer edge side of the vehicle width direction indicate the related art predicted-trajectories of left and right side edges of the tow vehicle. Whether or not an object is present in the region between sides 405*b*, 406*b* makes it possible to make a judgment on whether or not collision of tow vehicle 401 occurs. For example, obstacle 409 is in the region between sides 405*b*, 406*b* as illustrated in FIG. 4. Accordingly, the driver can make a judgment that tow vehicle 401 collides with obstacle 409 if the driver further moves tow vehicle 401 backward. Sides 405*c*, 406*c* in the backward direction serve as a distance indicator.

In FIG. 4, a line drawn by connecting the ends of sides 405*a* and 405*b* in the backward direction is shown as line 405*c*, and a line drawn by connecting the ends of sides 406*a* and 406*b* in the backward direction is shown as line 406*c*. Note that, lines 405*c* and 406*c* may not be connected in the ends thereof in the backward direction. As long as lines 405*c* and 406*c* connect lines 405*a* and 405*b*, and lines 406*a* and 406*b*, respectively, lines 405*c* and 406*c* may be in any form.

In addition, predicted-trajectory guide marks 405, 406 include stop indicators 407, 408 in their end portions in the direction of the tow vehicle, respectively. The driver can judge that tow vehicle 401 is coming close to tow-target vehicle 403 when stop indicators 407, 408 approach tow-target vehicle 403 as tow vehicle 401 moves backward. Stop indicators 407, 408, and predicted-trajectory guide marks 405, 406 may be displayed in different colors in order to distinguish stop indicators 407, 408, and predicted-trajectory guide marks 405, 406 from each other. In addition, although predicted-trajectory guide marks 405, 406 are configured to include stop indicators 407, 408, respectively, in this embodiment, it is not necessary for predicted-trajectory guide marks 405, 406 to include stop indicators 407, 408.

According to predicted-trajectory guide marks 405, 406, as illustrated in FIGS. 5 and 6, even when tow vehicle 401 approaches tow-target vehicle 403 as tow vehicle 401 gradually moves backward, tow vehicle side coupler 402 or tow-target vehicle side coupler 404 are not overlapped with images such as guide marks or indicators. The region between tow vehicle side coupler 402 and tow-target vehicle side coupler 404 is not overlapped with images such as guide marks or indicators, either. Thus, the driver can perform positioning while keeping tow vehicle side coupler 402 and tow-target vehicle side coupler 404 visible and without losing the positions of tow vehicle side coupler 402 or tow-target vehicle side coupler 404 from the captured image. Meanwhile, the driver can intuitively recognize that the region between side 405*a* and side 406*a* is the towing guide. In addition, this towing guide allows the drivers to intuitively recognize the predicted path of tow vehicle side coupler 402. Thus, the driver can accurately perform positioning between tow vehicle side coupler 402 and tow-target vehicle side coupler 404 as illustrated in FIG. 6 by moving tow vehicle 401 backward in such a way as to move tow vehicle side coupler 402 along the region between side 405*a* and side 406*a*. Moreover, the driver can use sides 405*b*, 406*b* of predicted-trajectory guide marks 405, 406 in the outer edge direction and thereby avoid an obstacle in the backward direction from coming into contact with a lateral surface of the vehicle body.

As described above, according to control section 109 of the present invention, i.e., image superimposing section 112, sides 405*a*, 406*a* of the pair of left and right predicted-trajectory guide marks 405, 406 which are located on the center side of the vehicle width direction are superimposed at positions in the outer edge direction from tow vehicle side coupler 402, and sides 405*b*, 406*b* of predicted-trajectory guide marks 405, 406 on the outer edge side of the vehicle width direction can be superimposed as predicted-trajectories of both of the lateral edges of the tow vehicle. Accordingly, it is made possible to intuitively recognize a guide for avoiding an obstacle in the backward direction of tow vehicle 401 from coming into contact with a lateral surface of a vehicle body and a guide for positioning between tow vehicle side coupler 402 and tow-target vehicle side coupler 404, and also to keep tow vehicle side coupler 402 and tow-target vehicle side coupler 404 visible.

In addition, predicted-trajectory guide marks 405, 406 are formed by connecting sides 405*a*, 406*a*, sides 405*b*, 406*b*, and distance indicators 405*c*, 406*c* in a planar fashion, respectively. Thus, two types of guides including the guide to avoid tow vehicle 401 from coming into contact with an obstacle located therearound and the towing guide can be represented by one type of guide marks. Accordingly, the driver can intuitively recognize multiple guides by one type of guide mark.

Image superimposing section 112 may change an image to be superimposed, between the normal backward assistance and the towing guide. For example, when state controlling section 113 detects an instruction to guide for assisting coupling between tow vehicle 401 and tow-target vehicle 403 from input section 107, image superimposing section 112 superimposes predicted-trajectory guide marks on the captured image. Meanwhile, when state controlling section 113 detects no towing guide instruction from input section 107 but detects a reverse state from gear position sensor 106, image superimposing section 112 reads predicted-trajectories on both of the lateral edges of the tow vehicle in accordance with the steering turning angle, and fixed trajectories corresponding to a zero steering turning angle, and superimposes the trajectories on the captured image. The predicted-trajectories of both of the lateral edges of the tow vehicle include at least sides 405*b*, 406*b*. Ideally, the leading end portions of sides 405*b*, 406*b* are connected together.

As described above, changing an image to be superimposed, between the normal backward assistance and the tow guide by image superimposing section 112 makes it possible to provide a required guide according to the state of the tow vehicle. For the normal backward assistance, no towing guide is required, and only one kind of guide to prevent an obstacle in the backward diction of the tow vehicle from coming into contact with a lateral surface of the vehicle body is necessary. The reason behind this is that superimposing predicted-trajectory guide marks 405, 406 even reduces the attention of the driver to sides 405b and 406b. Meanwhile, during the towing guide, two types of guides are required, and the towing guide keeping the visibility of tow vehicle side coupler 402 can be performed by superimposing predicted-trajectory guide marks 405, 406 because tow vehicle side coupler 402, which is the guiding target, is located at the center of a rear end portion of the vehicle body.

(Variation 1)

Figure 7:
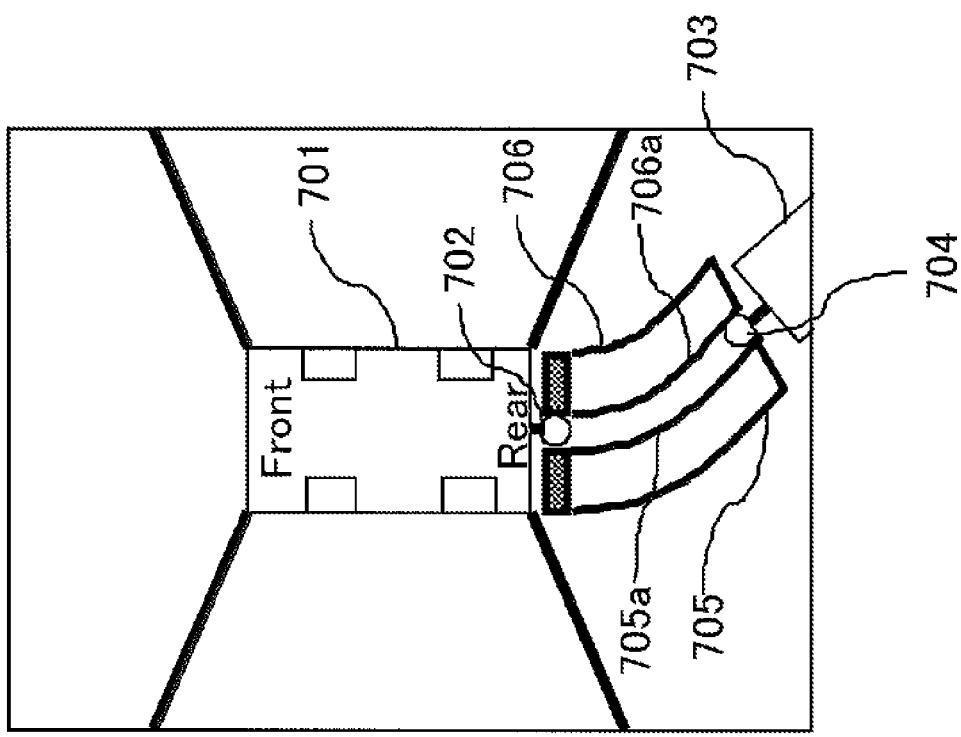
FIG. 7 is a diagram illustrating a representation of a variation of predicted-trajectory guide marks to be superimposed by the image superimposing section of FIG. 4.

Next, a variation of predicted-trajectory guide marks 405, 406 of FIG. 4 will be described. FIG. 7 is a diagram illustrating a representation of a variation of predicted-trajectory guide marks 405, 406 of FIG. 4, which are to be superimposed by image superimposing section 112.

Image conversion section 111 generates an overhead view image by converting a view point of the captured image acquired from image acquiring section 108. As illustrated in FIG. 7, image superimposing section 112 reads tow vehicle image 701, tow vehicle side coupler 702, and predicted-trajectory guide marks 705, 706 from storage section 110 and superimposes the read images on the overhead view image. The overhead view image also shows tow-target vehicle 703 and tow-target vehicle side coupler 704. The driver can perform positioning without losing the positions of tow vehicle side coupler 702 and tow-target vehicle side coupler 704 by moving tow vehicle 701 along the region interposed between side 705a and side 706a of predicted-trajectory guide marks 705 and 706 on the center side of the vehicle width direction.

The disclosure of the specification, the drawing, and the abstract of Japanese Patent Application No. 2011-44650, filed on Mar. 2, 2011, is incorporated herein by reference in its entirety.

INDUSTRIAL APPLICABILITY

The driving support apparatus and tow vehicle according to the present invention are useful in providing appropriate visibility support for coupling a tow vehicle to a tow-target vehicle.

REFERENCE SIGNS LIST

101 Driving support apparatus
102 Imaging section
103 Display section
109 Control section
112 Image superimposing section

The invention claimed is:

1. A driving support apparatus comprising:
a non-transitory computer readable medium configured to store steps of a control program and captured images of an area behind a vehicle;
a processor configured to execute the steps of the control program, the processor having a plurality of sections;
an image acquiring section that acquires a captured image of the area behind the vehicle supported by the driving support apparatus, the area including a tow coupler at a rear portion of the vehicle and a tow-target coupler of a tow-target vehicle to be coupled to the tow coupler; and
a superimposing section that superimposes a pair of left and right planar predicted-trajectory guide marks in accordance with steering operation of the vehicle supported by the driving support apparatus, on the captured image acquired by the image acquiring section and that outputs a superimposed image, wherein
each of the pair of left and right planar predicted-trajectory guide marks comprises at least a first line that forms a first side of the predicted-trajectory guide mark located toward a center of the vehicle's rear width and a second line that forms a second side of the predicted-trajectory guide mark located toward an outer edge of the vehicle's rear width, the first line being separated from the second line,
the superimposing section superimposes first lines of the predicted-trajectory guide marks starting at positions on either side of the tow coupler, such that the first lines of the predicted-trajectory guide marks indicate an alignment of a predicted-trajectory of the tow coupler with respect to the tow-target coupler of the tow-target vehicle, wherein a distance between the first lines of the predicted-trajectory guide marks is similar to a width of the tow coupler, and
the superimposing section superimposes second lines in of the predicted-trajectory guide marks starting near both rear corners of the vehicle, said second lines indicating a predicted trajectory of the vehicle's rear width.

2. The driving support apparatus according to claim 1, further comprising a display that displays the superimposed image provided by the superimposing section, wherein
the display displays the tow coupler in a gap between the first line of the left planar predicted-trajectory guide mark and the first lines of the right predicted-trajectory guide mark.

3. The driving support apparatus according to claim 2, further comprising a backward imaging section that captures an image of the area behind the vehicle supported by the driving support apparatus and that outputs the captured image to an image processing section.

4. The driving support apparatus according to claim 1, further comprising an image conversion section that generates an overhead view image by converting a view point of the captured image acquired from the image acquiring section, wherein
the superimposing section superimposes the pair of left and right planar predicted-trajectory guide marks in accordance with the steering operation of the vehicle supported by the apparatus, on the overhead view image generated by the image conversion section, in place of the captured image acquired by the image acquiring section, and that outputs the superimposed image.

5. The driving support apparatus according to claim 1, wherein a color of the first line and a color of an area between the first line and the second line are different from each other.

6. The driving support apparatus according to claim 1, further comprising a display that displays the superimposed image provided by the superimposing section, wherein
the display displays the captured image acquired by the image acquiring section in an area between the first line and the second line in the superimposed image.

7. The driving support apparatus according to claim 6, wherein the display does not display the captured image on the first line in the superimposed image.

8. The driving support apparatus according to claim 1, wherein the first lines of each of the predicted-trajectory guide marks are located on a center side of the vehicle's rear width, on each side of the tow coupler.

* * * * *